(No Model.)

F. D. & W. LISSON.
BUSH HAMMER.

No. 404,359. Patented May 28, 1889.

Witnesses:
John Grist
Chas Macnab

Inventors:
Francis D. Lisson
William Lisson
By Henry Grist
Attorney

UNITED STATES PATENT OFFICE.

FRANCIS DUKE LISSON AND WILLIAM LISSON, OF MERRICKVILLE, ONTARIO, CANADA.

BUSH-HAMMER.

SPECIFICATION forming part of Letters Patent No. 404,359, dated May 28, 1889.

Application filed December 6, 1888. Serial No. 292,822. (No model.)

*To all whom it may concern:*

Be it known that we, FRANCIS DUKE LISSON and WILLIAM LISSON, both of Merrickville, in the county of Grenville, in the Province of Ontario, in the Dominion of Canada, have jointly invented certain new and useful Improvements in Bush-Hammers; and we do hereby declare that the following is a full, clear, and exact description of the same, reference being had to the accompanying drawings, in which—

Figure 1:
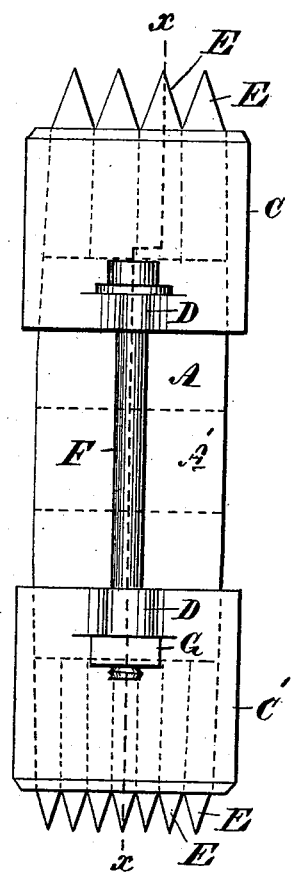
Figure 2:
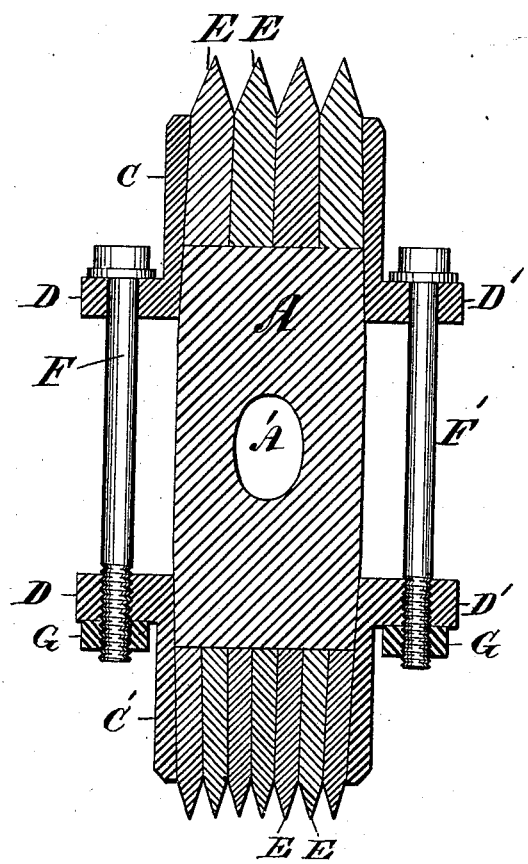

Figure 1 is a side elevation of our improved bush-hammer, and Fig. 2 is a section of the same on line X X.

Our invention has for its object to construct a bush-hammer in which a single point or tooth may be replaced by another and to cluster the teeth solidly together, whereby one tooth will support other teeth.

Our invention consists of a bush-hammer comprising a solid head having an eye for insertion of a handle, tubular tooth-holders convergingly beveled on the inside, the larger end sleeved on the ends of the head and provided with lugs on opposite sides externally, rectangular-sided teeth beveled on the four sides and pointed at the smaller end and filling the tooth-holders, and screw-bolts connecting the tooth-holders through the lugs, whereby the head will force the teeth endwise into the holders when the screws are tightened, as hereinafter more particularly described and claimed.

A is the hammer-head, about the form of a double cube, the sides tapered inwardly at the ends and having a central hole, A', to insert a suitable handle.

C C' are four-sided tubular tooth-holders beveled on the inside to fit the beveled ends of the head A, and each tooth-holder has lugs D D' on the outside at opposite sides.

E are square-sided teeth beveled on each side and pointed at the smaller end, and of such size that a desired number will fill the tooth-holder compactly when the points project from the outer end of the holder.

The tooth-holders are connected by screw-bolts F F', passing through a perforation in the lugs, and the bolts are provided with a nut, G, or, if desired, the bolts at one end may screw directly into the lugs, so that by screwing the nuts or the bolts the tooth-holders will be drawn closer together and cause the head to force the teeth endwise into the tooth-holders.

When it is desired to replace a defective tooth by a new one, the bolts are loosened and the tooth-holder removed from the head A, the defective tooth removed by striking it on the pointed end, and the new tooth inserted in its place. The tooth-holder is then replaced over the head and the bolts tightened.

We claim as our invention—

1. A bush-hammer comprising a head, A, beveled inwardly at the sides toward both ends, tubular tooth-holders C and C', sleeved on said head at opposite ends and connected by bolts F F', and rectangular-sided tapering teeth E, supporting one another within the tooth-holders, each tooth having an exposed pyramidical point and removable by disconnection of the tooth-holders from the hammer-head, as set forth.

2. The combination, with the hammer-head A, having the sides beveled inwardly at both ends, of the tubular tooth-holders C and C', sleeved thereon, the tapering teeth E, filling the tooth-holders, and bolts F F', connecting the tooth-holders, whereby the teeth are compressed together and confined against the hammer-head by drawing the tooth-holders closer together by the bolts, as set forth.

FRANCIS DUKE LISSON.
WILLIAM LISSON.

Witnesses:
A. McDONALD,
HOWARD BELL.

Correction in Letters Patent No. 404,359.

It is hereby certified that Letters Patent No. 404,359, granted May 28, 1889, upon the application of Francis Duke Lisson and William Lisson, of Merrickville, Ontario, Canada, for an improvement in "Bush-Hammers," were erroneously issued to said inventors as owners of the entire interest in the invention; that said Letters Patent should have been issued to *Francis Duke Lisson, William Lisson, Robert William Watchorn, and Thomas Henry Watchorn, jointly*, said Robert William Watchorn and Thomas Henry Watchorn being owners of one-half interest as shown by assignments of record in this office; and that the said Letters Patent should be read with this correction therein that the same may conform to the record of the case in the Patent Office.

Signed, countersigned and sealed this 4th day of June, A. D. 1889.

[SEAL.]

CYRUS BUSSEY,
*Assistant Secretary of the Interior.*

Countersigned:
   C. E. MITCHELL,
      *Commissioner of Patents.*